(12) United States Patent
Wiskow (10) Patent No.: US 8,281,508 B1
(45) Date of Patent: Oct. 9, 2012

(54) REVERSIBLE LICENSE PLATE HOLDER

(76) Inventor: Kurt K. Wiskow, Nokomis, FL (US)

( * ) Notice: Subject to any disclaimer, the term of this patent is extended or adjusted under 35 U.S.C. 154(b) by 0 days.

(21) Appl. No.: 13/170,295

(22) Filed: Jun. 28, 2011

(51) Int. Cl.
*G09F 7/00* (2006.01)
(52) U.S. Cl. .................................... 40/209; 40/734
(58) Field of Classification Search ............ 40/209–211, 40/644, 719, 781
See application file for complete search history.

(56) References Cited

U.S. PATENT DOCUMENTS

| | | | | |
|---|---|---|---|---|
| 2,082,434 A | * | 6/1937 | White | 40/209 |
| 2,910,793 A | * | 11/1959 | Easton et al. | 40/209 |
| 3,835,563 A | * | 9/1974 | Hanstad | 40/209 |
| 4,170,838 A | * | 10/1979 | Bott | 40/209 |

* cited by examiner

*Primary Examiner* — Casandra Davis
(74) *Attorney, Agent, or Firm* — Charles J. Prescott (57) ABSTRACT

A reversible license plate holder attachable to a prepared rear panel of a vehicle. A rectangular perimeter frame has an obverse and a reverse side and an open central area, the frame having an L-shaped cross-section defining a flange sized to be aligned with and receive a license plate positionable thereagainst. The frame also has spaced mounting holes which are alignable with mounting holes in the license plate and with threaded holes in the rear panel for attaching the holder against the rear panel. When the holder is attached to the rear panel so that the reverse side faces outwardly in a temporary use mode by a car dealer, an upper retaining tab forming a first U-shaped channel with the frame trappingly receives an upper edge of the license plate and a lower retaining tab forming a second U-shaped channel trappingly receives a lower edge of the license plate when a lower edge of the flange is resiliently flexed downwardly, then released. In this mode of use, only the flange and the upper and lower retaining tabs hold the license plate in place. In the permanent use mode, the obverse side is outwardly facing and the holder and license plate are attached to the rear panel or bumper together conventionally.

3 Claims, 10 Drawing Sheets

REVERSIBLE LICENSE PLATE HOLDER

CROSS-REFERENCE TO RELATED APPLICATIONS

Not applicable

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable

BACKGROUND OF THE INVENTION

1. Field of the Invention

This invention relates generally to vehicle attachments, and more particularly to a reversible license plate holder for use by a dealer in quickly installing and removing a dealer plate and in subsequent use by an owner of the vehicle to permanently retain a private license plate onto the rear of the vehicle.

2. Description of Related Art

When car and truck dealers acquire new and used vehicles ready for sale on one of their storage lots, typically a license plate holder will be attached to a rear panel of the vehicle specifically intended for attachment of a license plate thereto. These conventional license plate holders include logos and viewable indicia identifying the name of the dealer and also provide for mounting holes to attach the holder with a dealer license plate held within the holder to the rear panel of the vehicle. This dealer plate attachment is required, for example, whenever sales personnel allow the vehicle to go for a test drive by and with a potential customer or otherwise drive a dealer vehicle from the lot.

Currently, several cumbersome methods are used to attach the dealer's license plate to the rear of the vehicle. One method of attachment is through the use of a large magnet mechanically attached to the license plate and then magnetically attached to any steel part of the vehicle. However, the magnets may fail during the test drive, scratch the vehicle paint, or be unusable because there are no ferrous metal components available for magnetic attachment thereto. Another method of attaching a dealer license plate to the vehicle utilizes a heavy rubber license plate frame having two long rubber straps which may be hung from the vehicle's trunk lid when closed. This requires the trunk to be opened and closed for every test ride, many vehicles not supporting this approach to dealer plate attachment. A third method would be to simply unscrew the bolts from the license plate holder on the vehicle and then to attach the dealer plate in the normal position reusing the screws with or without the holder. This requires extra time and utilization of a tool in the form of a wrench or screw driver which typically is hard to locate in a large dealership setting. A fourth method is to place the dealer license plate in the rear of the window which can cause rattling, scratching of the rear defroster grid on the rear window, and still fail to provide adequate viewability of the dealer license plate during the test drive. Another unacceptable option for sales personnel is to simply do a test ride without a dealer plate attached whatsoever.

The present invention relieves the dealership personnel of the burden of less than ideal means for temporarily attaching the dealer license plate onto a new or used vehicle for demonstration ride or transport purposes. Once the invention is attached by threaded fasteners to the rear panel of the vehicle provided by the manufacturer, installation and removal of the dealer license plate for each test ride is quickly accomplished without the need for tools or other clumsy attachment techniques and with full assurance that the installation of the dealer license plate will be fully in compliance with all local and state laws requiring that vehicles driven from the dealer's property, whether for customer test drive, inventory swap, conveyance to and from an auction, or for any other purpose wherein the vehicle must be driven from the lot will be fully complied with.

The foregoing examples of the related art and limitations related therewith are intended to be illustrative and not exclusive. Other limitations of the related art will become apparent to those skilled in the art upon a reading of the specification and a study of the drawings.

BRIEF SUMMARY OF THE INVENTION

This invention is directed to a reversible license plate holder attachable to a prepared rear panel of a vehicle. A rectangular perimeter frame has an obverse and a reverse side and an open central area, the frame having an L-shaped cross-section defining a flange sized to be aligned with and receive a license plate positionable thereagainst. The frame also has spaced mounting holes which are alignable with mounting holes in the license plate and with threaded holes in the rear panel for attaching the holder against the rear panel. When the holder is attached to the rear panel so that the reverse side faces outwardly in a temporary use mode by a car dealer, an upper retaining tab on the reverse side and forming a first U-shaped channel with the frame trappingly receives an upper edge of the license plate and a lower retaining tab forming a second U-shaped channel trappingly receives a lower edge of the license plate when a lower edge of the flange is resiliently flexed downwardly, then released. In this mode of use, only the flange and the upper and lower retaining tabs hold the license plate in place. In the permanent use mode, the obverse side faces outwardly and the holder and license plate are fastened to the rear panel or bumper conventionally.

The present invention thus has a temporary or first mode of use and a permanent or second mode of use. In the first or temporary use mode, the frame is attached so that the reverse surface is outwardly facing and is attached to the rear panel of the vehicle utilizing threaded fasteners which are also utilized in the permanent use mode. This reverse side includes indicia displaying the dealer's advertising/logo information. The reverse side provides for several license plate retaining tabs along the upper and lower edges of the frame of the holder and preferably includes tabs to quickly implement the installation and removal of the dealer plate during each time period when the vehicle is to be driven from the dealer lot. The license plate installation and removal is accomplished quickly and without the need for any tools whatsoever.

In the permanent mode of use, the license plate holder functions as a normal license plate holder, providing for the display of the dealer's advertising/logo on the perimeter of the frame and also provides the retail customer's legal state license plate to be fully displayed in compliance with all municipal and state laws. This permanent use mode occurs after the vehicle has been sold.

It is therefore an object of this invention to provide a license plate holder which will quickly and, without the need of tools, supportively receive a dealer license plate holder and removal therefrom during any period wherein a vehicle must be driven from a dealer's car lot.

Still another object of this invention is to provide a reversible license plate holder which may be fastened to the rear of a vehicle during periods wherein the vehicle is for sale and will be test driven or otherwise removed from the dealer lot having a proper dealer license plate easily installed within the holder, and, wherein the license plate holder may be reversed and utilized by the new owner of the vehicle to support and retain a permanent private license plate onto the rear of the vehicle.

Still another object of this invention is to provide a reversible license plate holder having two modes of use, one being a temporary use during vehicle sale and test drives, and second mode being after the vehicle is sold for permanently retaining the owner's private license plate onto the rear of the vehicle.

Yet another object of this invention is to provide a reversible license plate holder having a temporary and a permanent use mode, both of which may include dealer advertising indicia formed thereon.

The following embodiments and aspects thereof are described and illustrated in conjunction with systems, tools and methods which are meant to be exemplary and illustrative and not limiting in scope. In various embodiments one or more of the above-described problems have been reduced or eliminated while other embodiments are directed to other improvements. In addition to the exemplary aspects and embodiments described above, further aspects and embodiments will become apparent by reference to the drawings and by study of the following descriptions.

Exemplary embodiments are illustrated in reference figures of the drawings. It is intended that the embodiments and figures disclosed herein are to be considered to be illustrative rather than limiting.

DETAILED DESCRIPTION OF THE INVENTION

Figure 9:
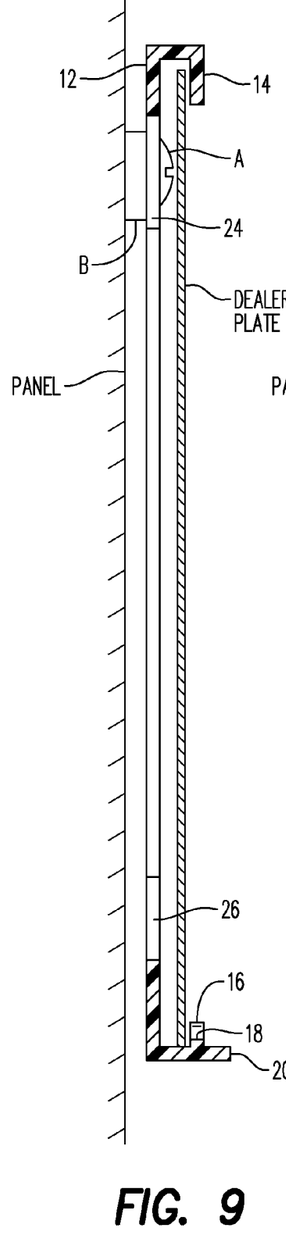
FIG. 9 is a section view in the direction of arrows 9-9 in FIG. 2.
Figure 10:
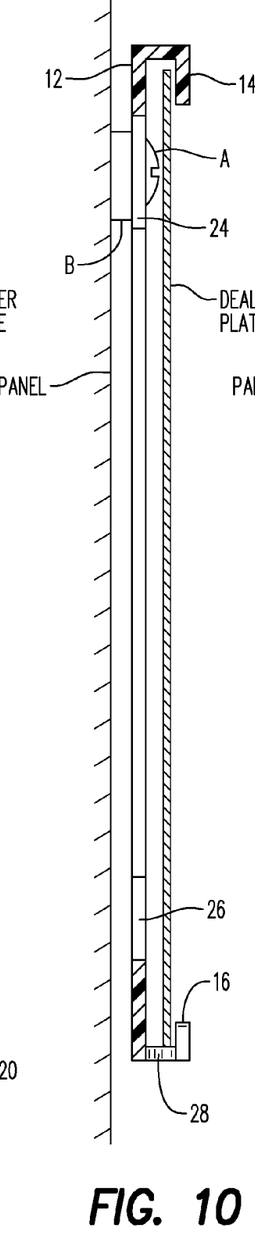
FIG. 10 is a section view in the direction of arrows 10-10 in FIG. 2.
Figure 11:
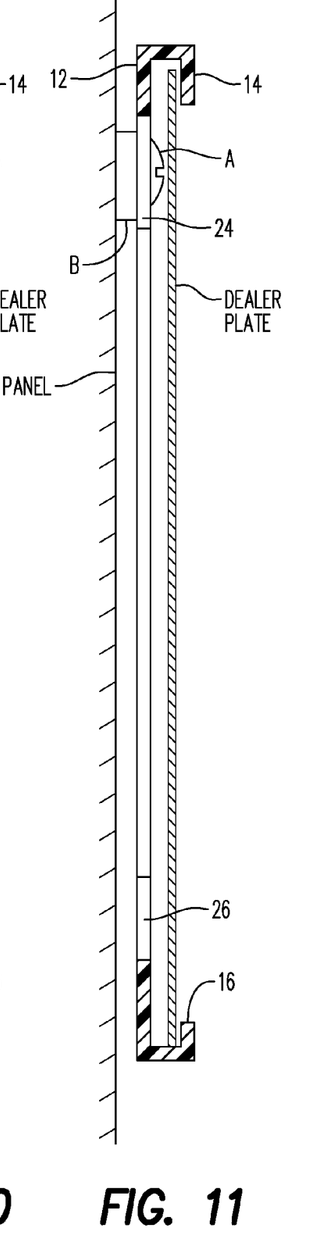
FIG. 11 is a section view in the direction of arrows 11-11 in FIG. 2.

Nomenclature 10. license plate holder
12. perimeter frame
14. upper retaining tab
16. lower retaining tab
18. thumb grip
20. thumb tab
22. reverse logo
24. mounting tab
26. mounting tab
28. finger cutout
30. obverse logo
32. obverse logo Referring now to the drawings, and firstly to FIGS. 1 to 11, the preferred embodiment is there shown generally at numeral 10 in the form of a plastic molded frame 12 formed as a unit and including an upper retaining tab 14 formed on a reverse side of the frame 12 which extends along and downwardly from an L-shaped cross-section of the frame 12 as best understood from FIGS. 9 to 11.

Figure 3:
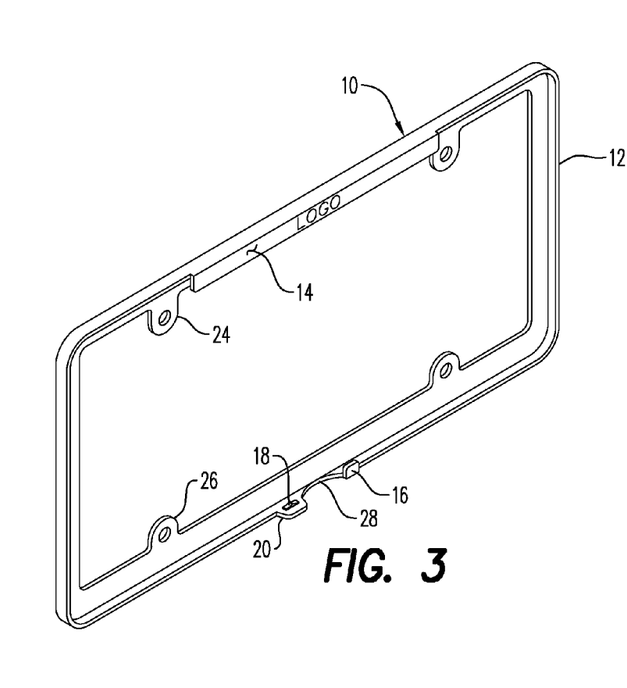
FIG. 3 is a perspective view of FIG. 1 absent the vehicle rear panel.
Figure 4:
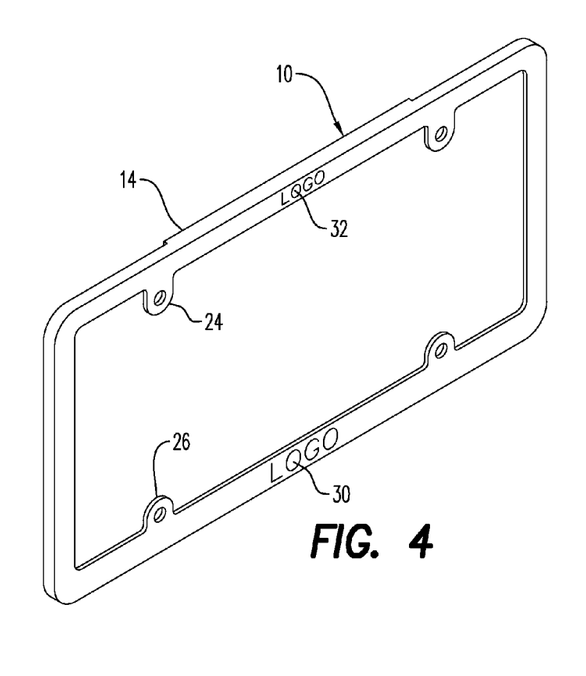
FIG. 4 is a perspective view of FIG. 3 showing the obverse side of the holder 10.
Figures 5, 6:
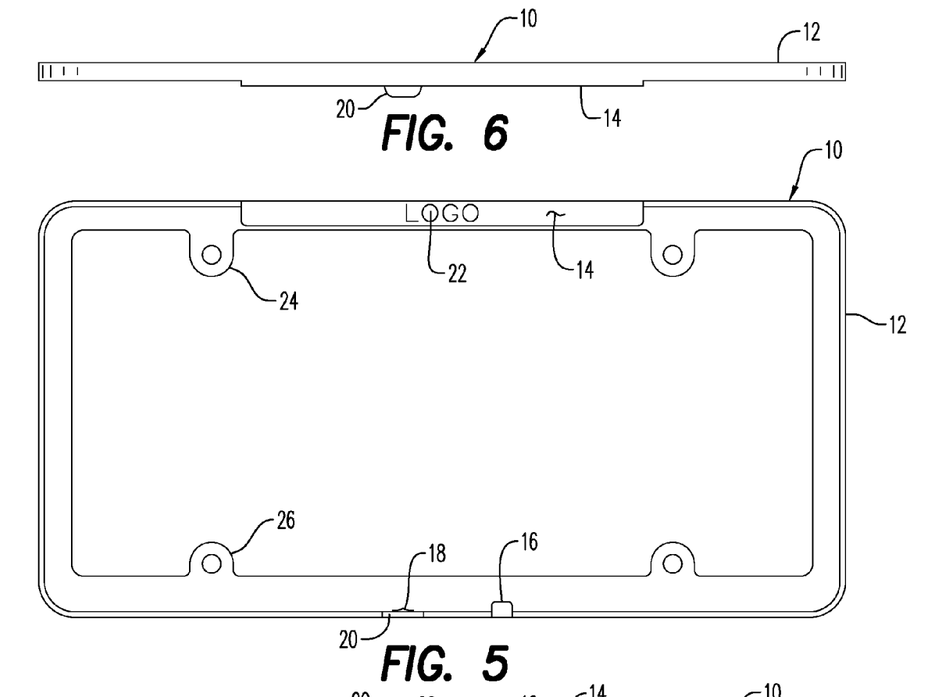
FIG. 5 is a front elevation view of FIG. 1.
FIG. 6 is a top plan view of FIG. 5.
Figure 7:
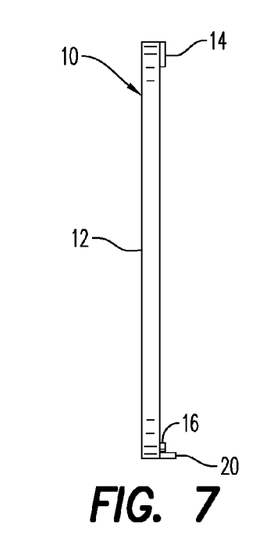
FIG. 7 is a left end elevation view of FIG. 5.
Figure 8:
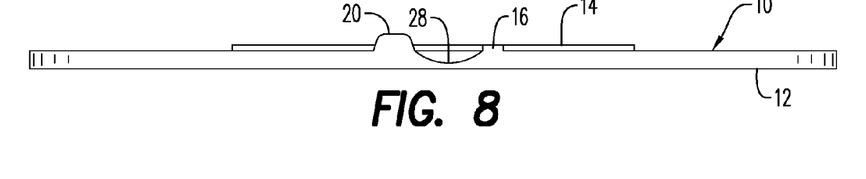
FIG. 8 is a bottom plan view of FIG. 5.

The flange of the frame 12 is sized to snugly receive the perimeter edges of a standardized license plate either in the form of a dealer license plate or a private license plate utilized by an owner of the vehicle after purchase. By providing the L-shaped configuration of frame 12, support for the license plate in all directions is provided. The frame 12 may be attached against a rear panel or bumper of a vehicle either with the reverse side facing outwardly as in a temporary first mode of use as seen in FIG. 3, or in a permanent use mode wherein the obverse side of the frame 12 is outwardly facing as shown in FIG. 4.

Figure 1:
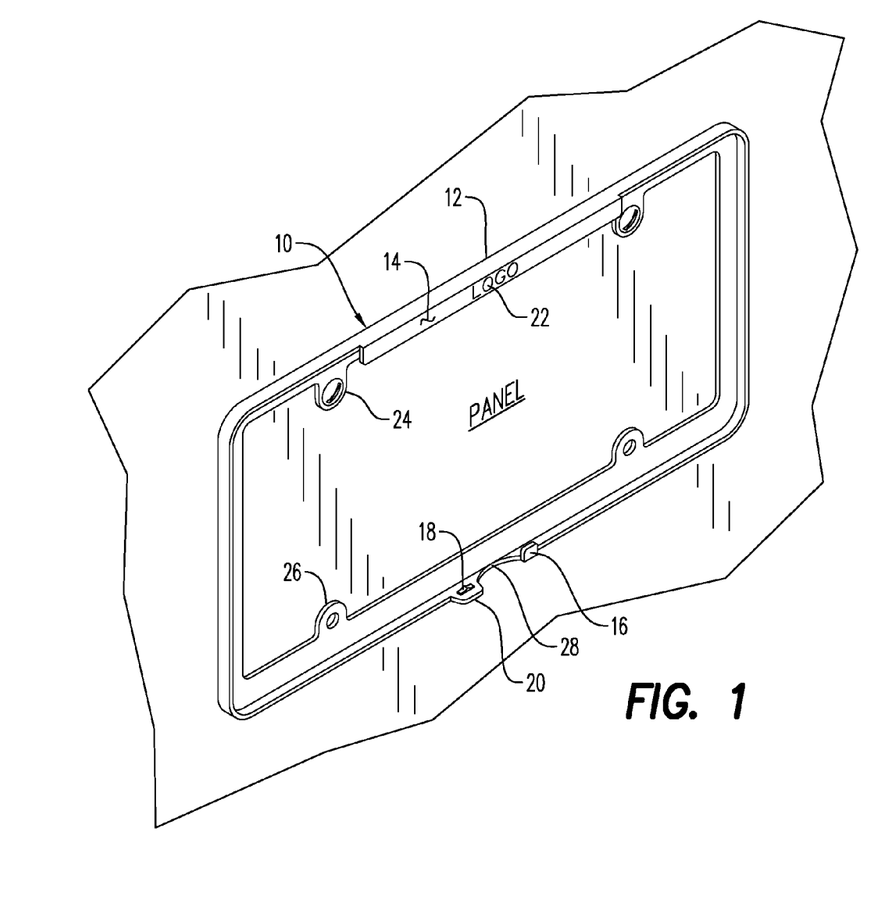
FIG. 1 is a perspective view of the preferred embodiment 10 of the invention fastened to a rear panel of a vehicle showing the reverse side outwardly.
Figure 2:
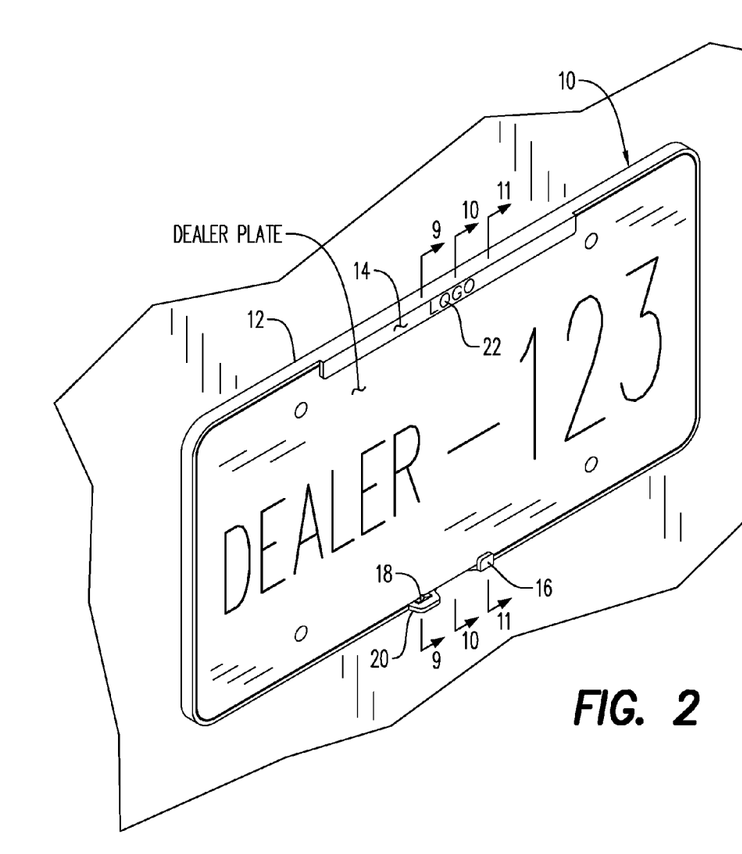
FIG. 2 is a perspective view of FIG. 1 showing a dealer license plate temporarily installed therein.

Additional features of the reverse side of the reverse side of the one piece molded as a unit frame 12 include mounting tabs 24 and 26 having mounting holes formed therethrough which are spaced apart laterally and vertically so as to match the standardized mounting holes formed into virtually all license plates. The upper portion of the frame 12 includes a downwardly extending retaining tab 14 which entraps the upper edge of the license plate. The lower portion of the frame 12 also includes an upwardly extending lower retaining tab 16 which, as best seen in FIG. 11, entraps the lower edge of the dealer license plate after the upper edge of the dealer license plate has been entrapped and held in the U-shaped channel formed by the L-shaped frame 12 and the downwardly extending upper retaining tab 14. With the dealer license plate held as shown in FIG. 2 without the aid of any additional mechanical fasteners or other attaching means whatsoever. Attachment of the license plate holder 10 against the rear panel is accomplished by the threaded fasteners passing through at least two of the four mounting tabs 24 and 26 as previously described.

Additional preferred features of the lower edge of frame 12 are in the form of a thumb tab 20 which outwardly extends from the reverse side of the license plate holder 10 and a thumb grip 18 which upwardly extends from the top surface of the thumb tab 20.

Figure 12:
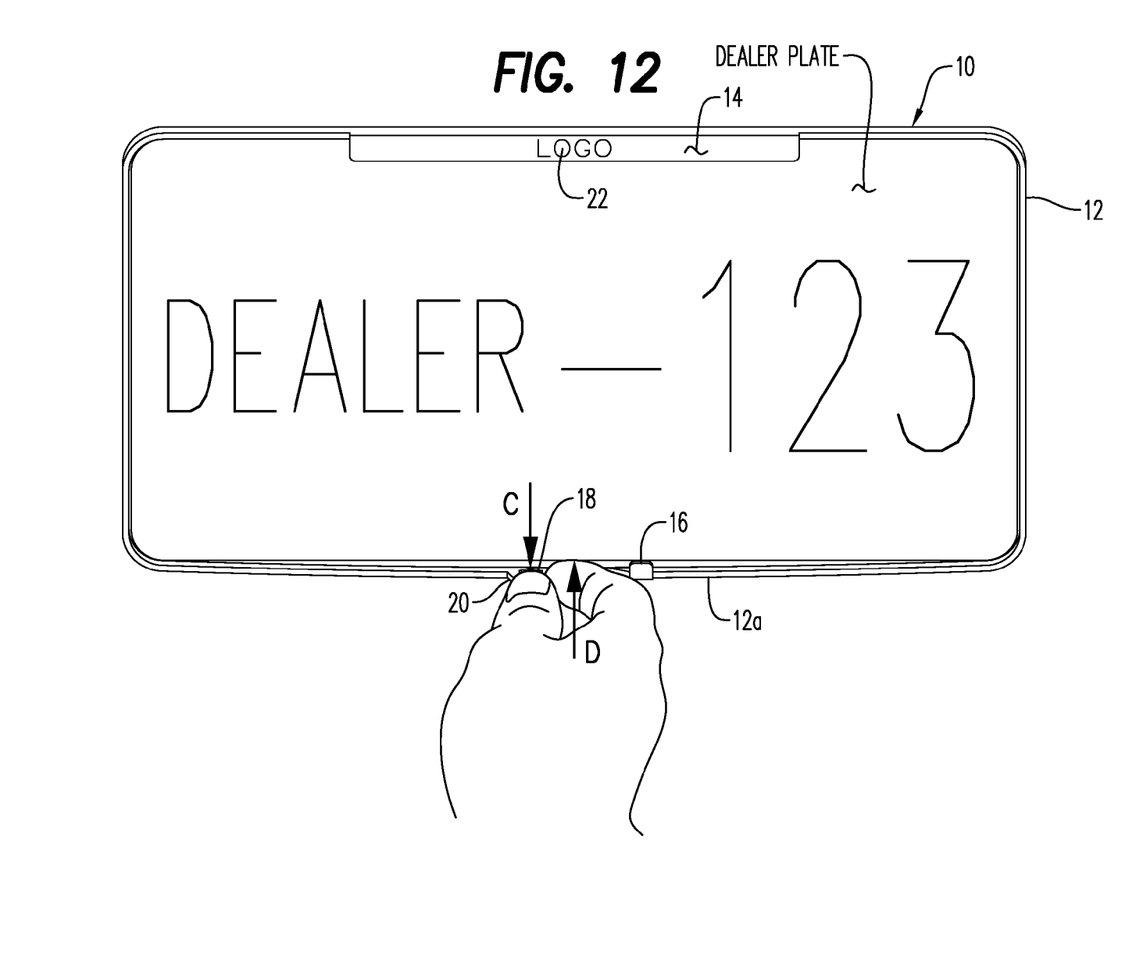
FIG. 12 is a front elevation view of FIG. 2 showing the last step of installation of a dealer license plate into the holder 10 and the first step of license plate removal therefrom.
Figure 13:
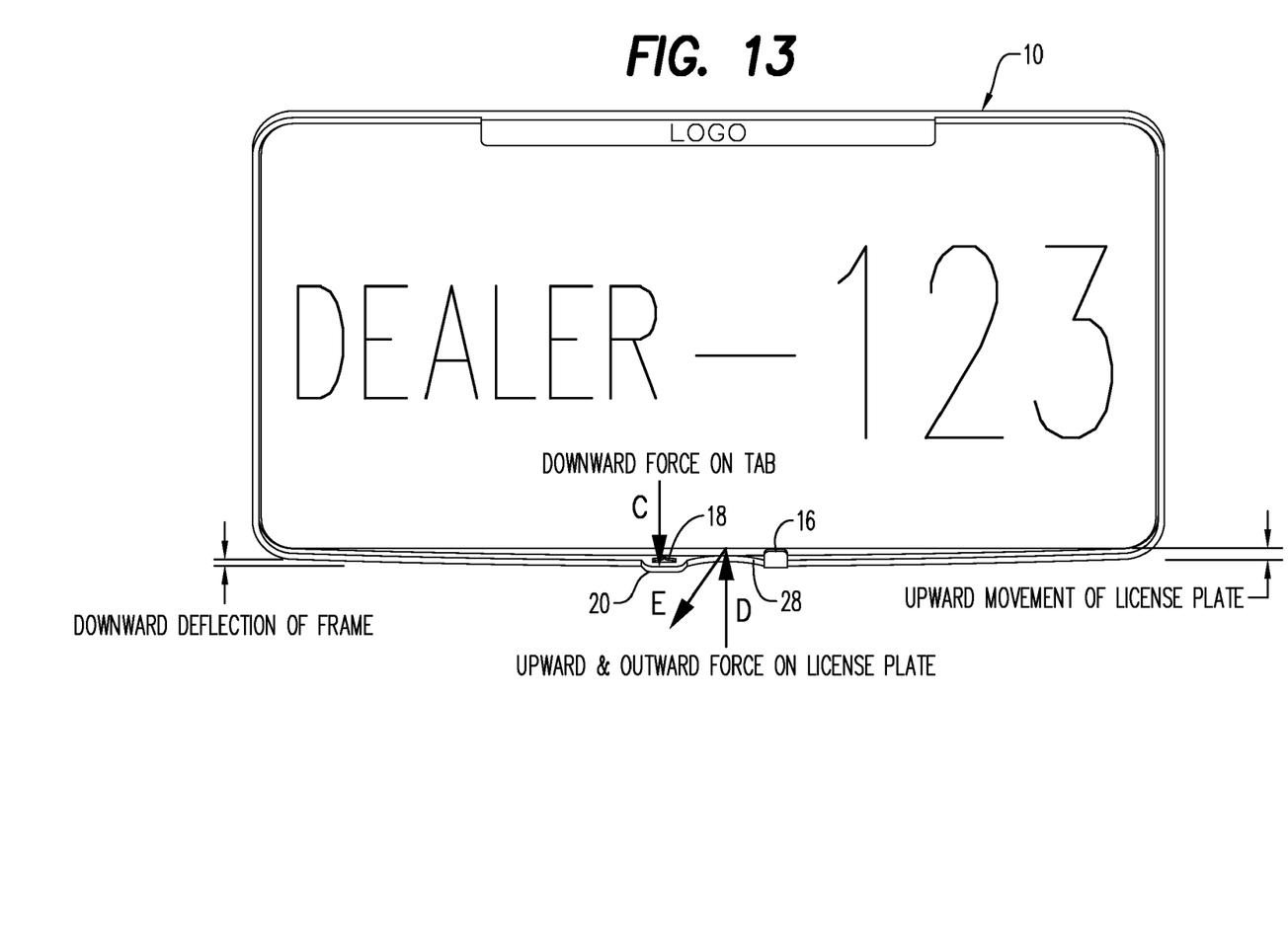
FIG. 13 depicts a simple force diagram shown by the arrows depicting the sequential two dimensional forces exerted on the license plate holder and the license plate itself during installation and removal of the license plate.

Additionally, it is preferred to provide a finger cutout 28 formed into the flange of frame 12 so as to facilitate virtual one-handed installation of the dealer license plate each time the vehicle so equipped is driven from the dealer's lot. Referring additionally to FIGS. 12 and 13, installation and removal of the dealer license plate from temporarily being held and restrained within the license plate holder 10 is there demonstrated. Once the upper edge of the dealer license plate has been moved upwardly and entrapped in the U-channel formed between the upper edge of the frame and the upper retaining tab 14, the lower edge 12a of the frame 12 must be resiliently flexed downwardly in the direction of arrow C while the license plate is retained in the upward position by applying a finger force in the direction of arrow D. In this configuration, the lower edge of the license plate will just clear the top edge of the lower retaining tab 16, both during installation and removal of the license plate.

Figures 14, 15, 16:
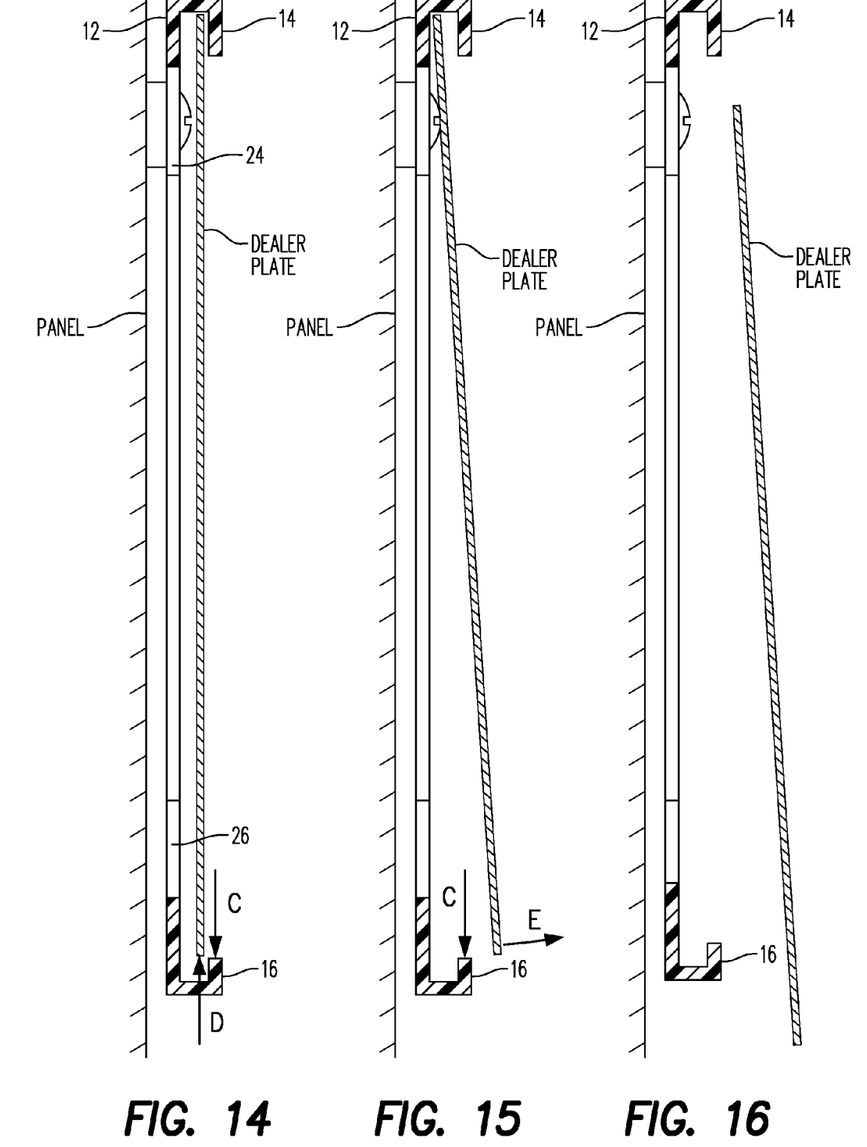
FIGS. 14, 15 and 16 are views of FIG. 11 depicting the sequential removal of a dealer license plate from the license plate holder 10.

These optional and preferred features of the lower edge 12a of the frame 12 come into play so as to facilitate this easy installation and removal of the dealer plate from the holder 10. The index finger is inserted into the finger cutout 28 which facilitates the easy upward pressure in the direction of arrow D necessary to either move the dealer plate upwardly during installation or to hold this position during plate removal. Thereafter, the thumb is moved downwardly against the thumb tab 20 resulting in the downward deflection of the lower margin 12a of frame 12. By hand rotation of the index finger against the lower edge of the dealer plate, a force E is applied to easily cause the lower edge of the dealer plate to be moved outwardly over the top of the lower retaining tab 16. This removal process is best shown in FIGS. 14 to 16 absent finger and thumb interaction for clarity.

Figure 17:
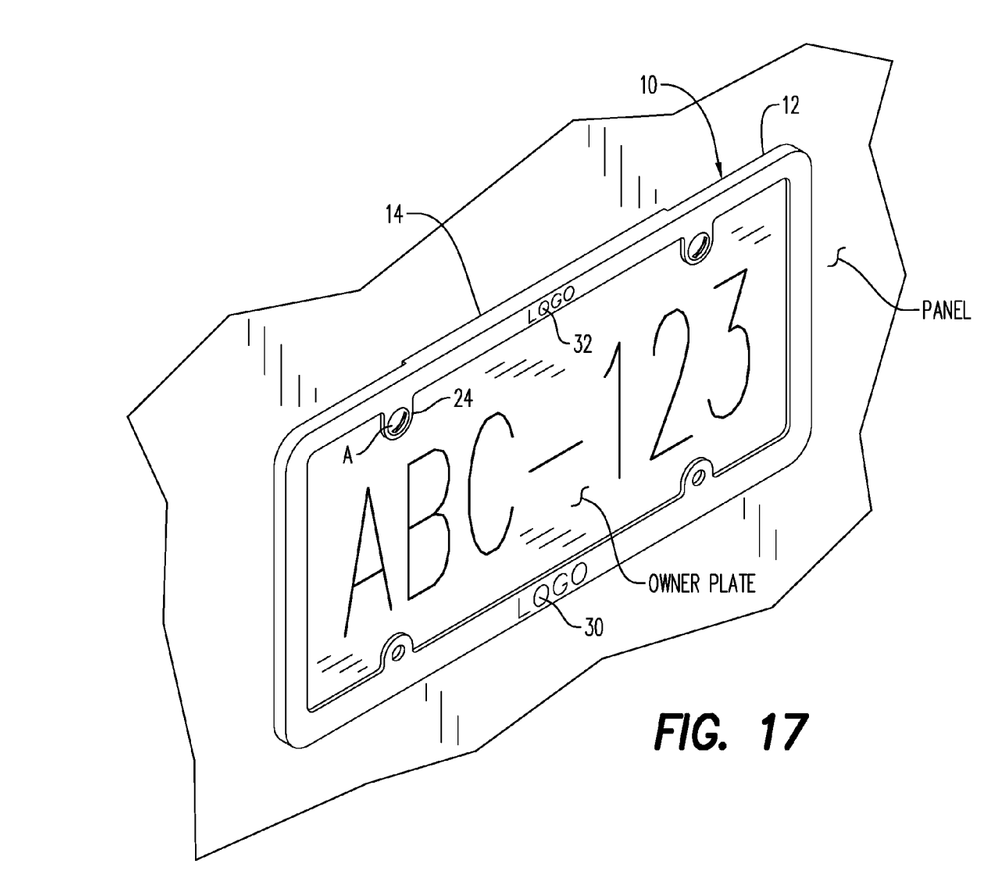
FIG. 17 is a perspective view of the obverse side of the holder 10 attached to a rear panel of a vehicle in permanent fastener retention of a private license plate of the owner.

As seen in FIG. 17, after the vehicle has been sold, the new owner will need to have his owner plate installed onto the rear panel. The holder 10 is then removed and the owner plate is positioned within the frame as previously described except that the is outwardly positioned and retained within the upper and lower retaining tabs 14 and 16 as previously described. With the obverse side of the frame 12 outwardly facing, the threaded fasteners A are inserted into at least two of the mounting tabs 24 or 26 to permanently retain this arrangement against the rear panel of the vehicle.

Figure 18:
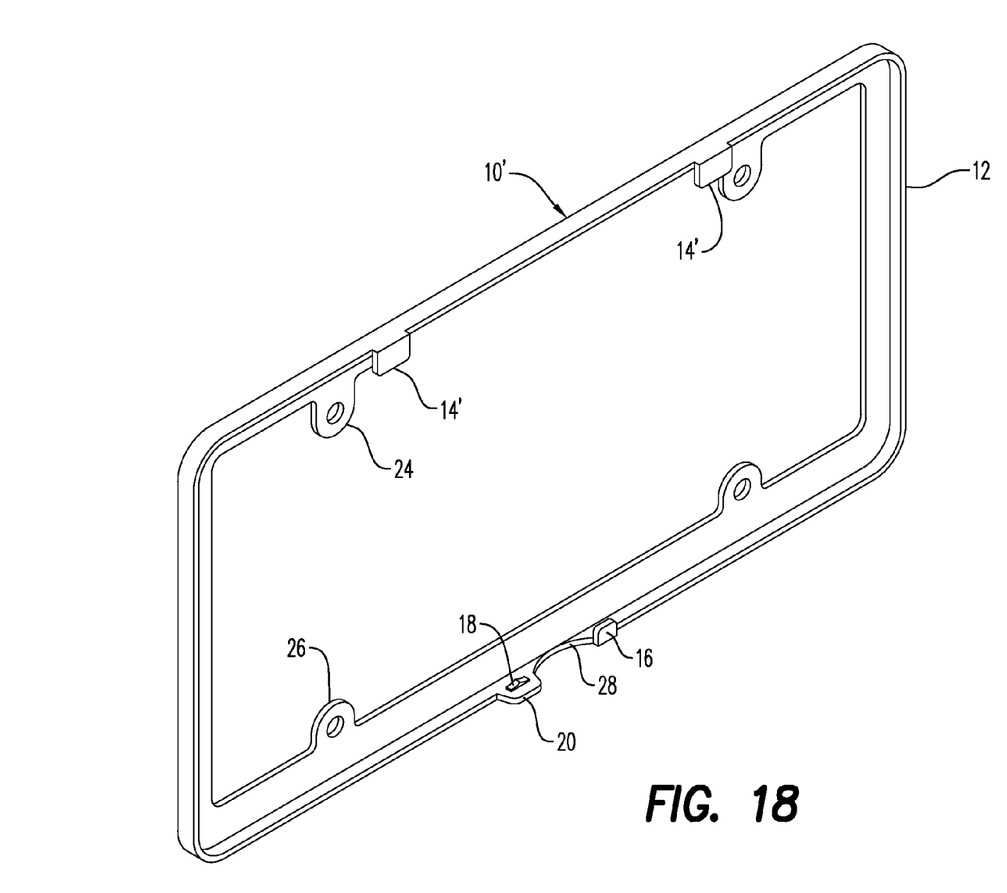
FIG. 18 is a perspective view of the reverse side of an alternate embodiment 10' of the holder to that shown in FIG. 2.

Referring lastly to FIG. 18, an alternate embodiment of the invention is there shown generally at numeral 10' wherein all of the similarly numbered features previously described are incorporated into this embodiment 10', except that the elongated upper retaining tab 14 has been replaced by two small retaining tabs 14'. Otherwise, this embodiment 10' functions to retain a dealer plate when the reverse side of this embodiment 10' is outwardly facing and attached against the rear panel of a vehicle, as well as to retain an owner plate against the rear panel of the vehicle with the obverse side of this embodiment 10' outwardly extending in the permanently installed configuration against the vehicle as previously described.

While a number of exemplary aspects and embodiments have been discussed above, those of skill in the art will recognize certain modifications, permutations and additions and subcombinations thereof. It is therefore intended that the following appended claims and claims hereinafter introduced are interpreted to include all such modifications, permutations, additions and subcombinations that are within their true spirit and scope.

The invention claimed is:

1. A reversible license plate holder attachable to a rear panel of a vehicle comprising:
   a rectangular perimeter frame formed as a unit having an obverse and a reverse side and an open central area, the frame having an L-shaped cross-section defining a flange sized to be aligned with and to receive a license plate positionable thereagainst;
   the frame also having spaced holed mounting tabs which are alignable with mounting holes in the license plate and with threaded holes in the rear panel for attaching the holder together with the license plate against the rear panel;
   the frame also having on the reverse side thereof an upper retaining tab forming a first U-shaped channel with the frame which trappingly receives an upper edge of the license plate;
   the frame further having on the reverse side thereof a lower retaining tab forming a second U-shaped channel which trappingly receives a lower edge of the license plate when a lower edge of the flange is resiliently flexed downwardly, then released, only the flange and the upper and lower retaining tabs temporarily holding the license plate in place;
   the obverse side formed by the flange covering a perimeter of the license plate when the reverse side is positioned and held against the panel by threaded fasteners passing through aligned holes in the mounting tabs and the license plate and threadably engaged into threaded holes in the rear panel;
   a thumb tab extending outwardly from a central portion of the lower edge of the flange, the thumb tab having an upwardly extending thumb grip, the thumb tab and thumb grip cooperatively arranged to facilitate temporary installation and removal of the license plate;
   a finger clearance formed into the lower edge of the flange adjacent the thumb tab to provide finger access for thumb engagement with the thumb tab.

2. A reversible license plate holder attachable to a rear panel of a vehicle comprising:
   a frame having a L-shaped cross-section having an obverse and a reverse side and an open central area, the frame to receive and supportively retain a license plate;
   the frame also having spaced holed mounting tabs which are alignable with mounting holes in the license plate and the rear panel;
   the frame also having an upper retaining tab extending vertically downwardly from an upper portion of the frame forming an upper U-shaped channel with the L-shaped cross-section of the frame which trappingly receives an upper edge of the license plate;
   the frame further having on a lower retaining tab extending vertically upwardly from a lower portion of the frame forming a lower U-shaped channel with the L-shaped cross-section of the frame which trappingly receives a lower edge of the license plate;
   a thumb tab extending horizontally outwardly from a central portion of the lower portion of the frame along the lower edge of the L-shaped cross-section to facilitate resilient downward flexing of the lower edge of the L-shaped cross-section for installation and removal of the license plate.

3. A reversible dual use mode license plate holder selectively attachable to a rear panel of a vehicle, the holder having a reverse or dealer side for a dealer use mode and an obverse or owner side for an owner use mode, said holder comprising:

a perimeter frame formed having an open central area and an L-shaped cross-section defining a flange sized to receive and support a license plate;

the frame also having spaced holed mounting tabs which are alignable with mounting holes in the license plate and in the rear panel for attaching the holder against the rear panel either alone in the dealer use mode with the reverse or dealer side outwardly facing or together with the license plate in the owner use mode with the obverse or owner side outwardly facing;

the frame also having on the reverse or dealer side an upper retaining tab extending vertically downwardly from an upper portion of the frame forming a first U-shaped channel with the L-shaped cross-section of the frame which trappingly receives an upper edge of the license plate and a lower retaining tab extending vertically upwardly from an lower portion of the frame forming a second U-shaped channel with the L-shaped cross-section of the frame which trappingly receives a lower edge of the license plate;

a thumb tab extending horizontally outwardly from a central portion of a lower portion of the frame along the lower edge of the L-shaped cross-section to facilitate resilient downward flexing of the lower edge of the L-shaped cross-section for installation and removal of the license plate.

* * * * *